Sept. 20, 1971  E. A. BECK  3,605,959
ADJUSTING MEANS FOR DISC BRAKES
Filed Sept. 15, 1969
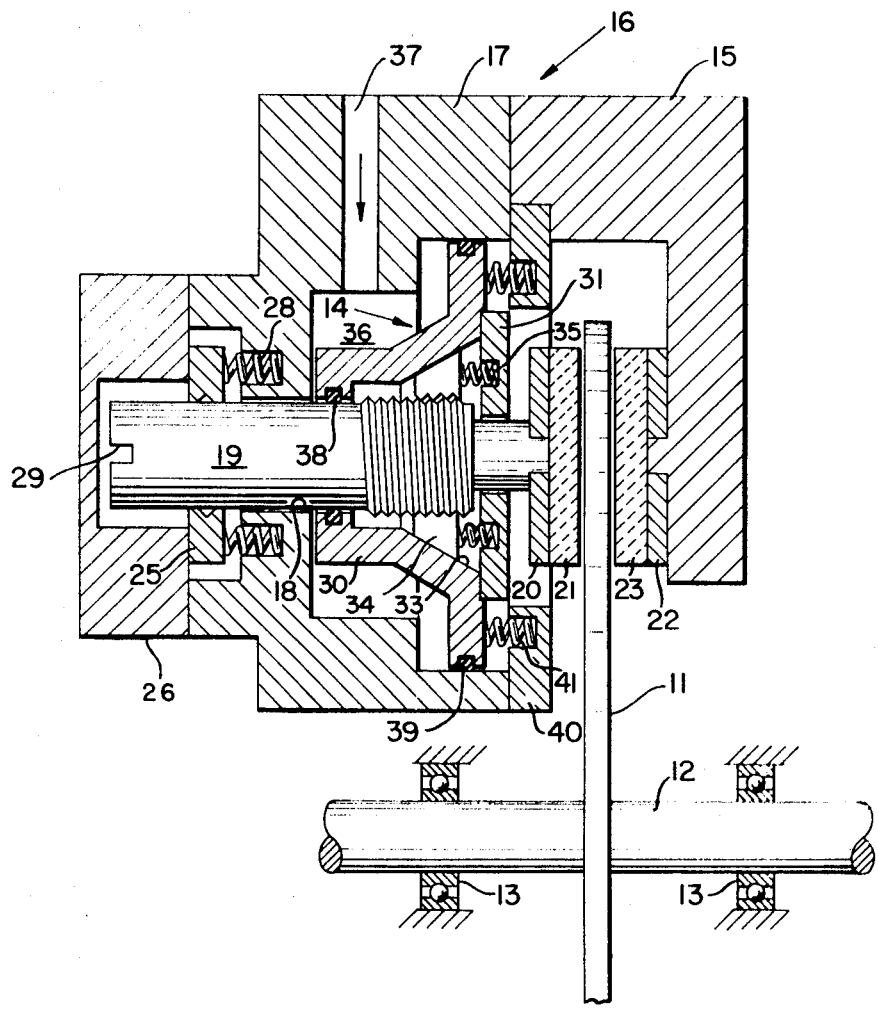
INVENTOR.
EARL A BECK
BY
Albert J Miller
ATTORNEY United States Patent Office 3,605,959
Patented Sept. 20, 1971

3,605,959
ADJUSTING MEANS FOR DISC BRAKES
Earl A. Beck, Stillwater, Okla., assignor to The Garrett Corporation, Los Angeles, Calif.
Filed Sept. 15, 1969, Ser. No. 858,024
Int. Cl. F16d 65/54, 55/18
U.S. Cl. 188—196P
3 Claims

ABSTRACT OF THE DISCLOSURE

A disc brake having a caliper assembly straddling a portion of the periphery of a rotatable disc and including piston means slidably supported by the caliper to bring a brake shoe into frictional engagement with the disc. The piston means incorporating an automatic adjusting device for taking up slack and wear in the brake linings. The adjusting device is an extensible assembly that is interposed between the piston and the brake shoe to maintain a substantially constant piston stroke and cylinder chamber.

---

Before effective pressure can be applied to the brake shoes of a pneumatic brake, the pneumatic fluid must first be compressed. Since the feed rate of the pneumatic fluid is generally constant, the time required to compress the fluid is directly related to the volume to be compressed. The delay resultant from this compression is normally referred to as a time lag.

Present brake adjusting systems, while effectively compensating for piston travel, do not compensate for the change in the volume behind the piston or in the size of the hydraulic cylinder chamber. Consequently, as the brake linings wear, the time lag of the present system will increase.

Therefore an object of this invention is to provide a brake system wherein the initial volume behind the piston is maintained substantially constant.

Another object of this invention is to provide a pneumatic brake system having a substantially constant time lag or response time during the entire life of the brake linings.

These and other objects and features of the present invention will become apparent from the review of the following specification and claims when taken in conjunction with the sole fingure schematically illustrating the novel brake system.

Referring to the drawing, a brake disc 11 is fixedly mounted on a rotating shaft 12 supported by suitable bearings 13. A caliper assembly 16 straddles the brake disc 11. This caliper assembly is suitably mounted to a fixed part of the vehicle or other apparatus which rotatably supports the shaft 12 so as to float in a direction normal to the plane of the brake disc 11. Alternately, the brake disc 11 can be made to axially float on the splined shaft 13.

The caliper assembly 16 includes a housing 17 having a central bore 18 extending along an axis normal to the disc 11 to receive the brake adjusting means 15. An anvil 15 extends outward from the housing 17 to straddle the brake disc 11. A rod 19 is slidable within the bore 18 of housing 17. Mounted at one end of the rod 19, in proximity to the disc 11, a brake shoe 20 having a suitable brake pad or lining 21. A corresponding brake shoe 22 and pad or lining 23 are mounted on the anvil 15 opposite the rod mounted brake shoe 20.

The rod 19 is frictionally held by a grip ring 25 positioned around the rod 19 and secured against springs 28 by an end cap 26 which seals the end of the bore 18. A slot 29 may be provided at this end of the rod 19 to facilitate turning of the rod during assembly and removal.

The brake shoe end of the rod 19 is slidable within a substantially cup-shaped piston 30 having an apertured plate 31 affixed to its open end. The portion of the rod 19 enclosed within the cup-shaped piston 30 is provided with threads or helical V-grooves 32. The internal surface of the piston 30 is tapered to provide an integrally formed ramp 33. A plurality of wedge-shaped dogs 34 are positioned on the ramp 33 and have V-grooves to cooperate with the V-grooves 32 of the rod 19. Spring 35, extending from the plate 31 bias the dogs 34 against the ramp 33.

The piston 30 is operative within an enlarged portion of the housing bore 18. A cylinder chamber 36 is formed between the piston 30 and the enlarged portion of the housing bore 18. A fluid pressure source (not shown) communicates with the cylinder chamber 36 through port 37. Suitable seals 38 and 39, such as O-rings, are provided between the piston 30 and the rod 19 and between the piston 30 and the housing 17 respectively. The piston 30 is biased away from the disc 11 by springs 41 extending between the piston 30 and an annular ring 40 fixed to the housing 17.

As illustrated, the disc is rotating freely and there is no braking action. The rod 19 is biased in this retracted position by the springs 28 acting against the grip ring 25. These springs hold the ring against the end cap 26 to insure against drag and to prevent accidental rattching between the dogs 34 and V-grooves 32.

Application of the brakes is accomplished by applying pneumatic pressure to chamber 36 through port 37. The pressure acts against the piston 30 which compresses springs 35 as it travels towards the disc 11. This movement of the piston 30 causes the dogs 34 to wedge against the V-grooves 32 of the rod 19. The dogs 34 will force the rod 19 to move towards the disc 11 along with the piston 19. The friction ring 25 moves with the rod 19 thus compressing springs 28.

With the new brake linings 21 and 23 not having any wear, the friction ring 25 will not move against the housing 17. Release of pressure from chamber 36 will permit the piston 30 and consequently the rod 19 to return to their original illustrated positions under the action of the springs 41 and 28 respectively. Movement of the piston 30 away from the disc 11 releases the dogs 34 from the V-grooves on the rod 19 allowing independent movement of the rod 19 away from the disc 11.

As the brake lining wears, the axial distance traversed by the rod 19 will increase until the movement of the grip ring 25 will fully compress springs 28 during travel towards the disc 11. If there is sufficient wear in the linings 21 and 23, the rod 19 will move relative to the ring 25. The spacing between the open end of the piston 30 and the annular ring 40 is greater than the spacing between the friction ring 25 and housing 17. In this manner the ring 25 takes up a new position closer to the end cap end of the rod 19, and the V-grooves 32 will extend farther into the piston 30.

When the pressure is then released, the ring 25 returns to its original position against the end cap 26 and the piston 30 returns to its position against the housing 17. Since the piston 30 must travel a greater distance than the rod 19 the wedging action of the dogs 34 against the V-grooves 32 is removed as the dogs 34 move up the ramp 33. The new position of the ring 25 insures that the linings 21 and 23 maintain the predetermined distance from the disc 11.

When the movement of the ring 25 with respect to the rod becomes great enough, the dogs 34 will ratchet into the next adjacent groove with the aid of springs 35. If the linings have not been worn sufficiently, the dogs will again grab the same grooves as before. The increment between adjustments can be decreased by forming the V-grooves as a helix and utilizing 4 dogs positioned at 90° increments around the rod. The minimum adjustment is then one-quarter of the pitch or lead of the thread-like V-grooves. This also limits the actual wedging action to one dog at a time with the remaining dogs serving as a back-up.

Replacement of a completely worn brake lining can be easily accomplished by removing the cap 26 and screwing the rod 19 outward. Sufficient clearance is provided to replace both brake shoes and linings.

Since the piston 30 always returns to the same initial position against housing 17 regardless of brake lining wear, the initial volume in the chamber 36 is the same each time the brakes are applied. Also, since the travel of the piston 30 during the application of the brakes will be substantially the same each time, the volume will be substantially the same after each time the brakes are fully applied. Thus the response time or time lag will be essentially independent of brake lining wear and remain constant for all practical purposes.

While the brake has been described as a pneumatic system, it can work equally well when applied to a hydraulic system. Thus, while a specific embodiment of the invention has been illustrated and described, it is to be understood that this embodiment is provided by way of example only and that the invention is not to be construed as being limited thereto, but only by the proper scope of the following claims.

What is claimed is:

1. A disc brake assembly having opposed braking surfaces for braking a rotatable disc comprising:
   a caliper assembly straddling at least a portion of the periphery of the disc, and including a housing having a stepped central bore therein closed at one end, said central bore having an enlarged portion at its open end;
   a substantially cup-shaped piston slidably mounted in the enlarged portion of said bore;
   said piston and the enlarged portion of said bore defining a piston chamber to receive fluid under pressure for actuating said piston towards said rotatable disc, the internal surface of said cup-shaped piston being tapered to form a ramp surface;
   means to bias said piston away from said rotatable disc and against the end of the enlarged portion of said bore;
   a rod member extending within said bore and through said piston; the portion of said rod within said piston having thread-like ridges;
   a first brake member associated with one end of said rod to alternately engage and disengage said rotatable disc;
   a second brake member associated with said caliper assembly opposite said first brake member;
   a plurality of wedge-shaped dogs associated with said ramp surface of said piston and positioned around said rod within said piston, said dogs having thread-like ridges to cooperate with the thread-like ridges of said rod, movement of the piston towards said disc forcing said dogs to engage said rod and move said rod with said piston;
   means to bias said dogs against the ramp surface of said piston; and
   wear compensating means operably associated with said rod to extend the rod further within said piston as brake member wear increases while permitting said piston to return to the same initial position following release of actuating pressure.

2. The disc brake assembly of claim 1 wherein said wear compensating means comprises: friction grip means positioned around said rod, means to bias said friction grip means away from said rotatable disc, and means to reposition said friction grip means on said rod dependent upon the wear on said brake members.

3. The disc brake assembly of claim 2 wherein said piston biasing means, said dog biasing means, and said friction grip biasing means each comprise a plurality of coil springs.

References Cited

UNITED STATES PATENTS

| | | | |
|---|---|---|---|
| 2,904,137 | 9/1959 | Reisch | 188—196R |
| 3,033,325 | 5/1962 | Tjernstrom | 188—71.7X |

FOREIGN PATENTS

| | | | |
|---|---|---|---|
| 1,256,553 | 12/1967 | Germany | 188—71.8 |

DUANE A. REGER, Primary Examiner

U.S. Cl. X.R.

188—71.8